US005781122A

United States Patent [19]

Katagiri

[11] Patent Number: 5,781,122

[45] Date of Patent: Jul. 14, 1998

[54] INDIVIDUAL SELECTIVE CALL RECEIVING APPARATUS AND METHOD FOR DISPLAYING MESSAGE

[75] Inventor: Atsushi Katagiri, Yokohama, Japan

[73] Assignee: Matsushita Electric Industrial Co., Ltd., Osaka, Japan

[21] Appl. No.: 578,870

[22] Filed: Dec. 28, 1995

[30] Foreign Application Priority Data

Dec. 28, 1994 [JP] Japan .................................... 6-326905

[51] Int. Cl.$^6$ ........................................ H04Q 7/14

[52] U.S. Cl. .................................. 340/825.44; 340/311.1; 455/38.4

[58] Field of Search ............................ 340/825.44, 311.1; 455/38.4; 345/146, 902; 395/762, 348, 349, 351, 352, 430, 521

[56] References Cited

U.S. PATENT DOCUMENTS 5,016,192 5/1991 Ishido et al. ............................ 395/521
5,258,751 11/1993 DeLuca et al. .................... 340/825.44
5,430,436 7/1995 Fennell ............................... 340/825.44
5,598,548 1/1997 Matsuo et al. .......................... 395/430

FOREIGN PATENT DOCUMENTS 59-53736 12/1984 Japan .
325059 4/1991 Japan .

*Primary Examiner*—Edwin C. Holloway, III
*Attorney, Agent, or Firm*—Lowe Hauptman Gopstein & Berner

[57] ABSTRACT

A display section 5 displays the confirmation to an instruction entered through an operating section 4 and the content of the processing performed in a signal processing section 3. Hence, users can check the interim progress of the processing by monitoring a display screen on the display section 5. Therefore, the users can quickly confirm whether or not the processing has been accurately performed.

24 Claims, 6 Drawing Sheets

INDIVIDUAL SELECTIVE CALL RECEIVING APPARATUS AND METHOD FOR DISPLAYING MESSAGE

BACKGROUND OF THE INVENTION

1. Field of the Invention

The present invention relates to an individual selective call receiving apparatus equipped with a display section capable of displaying messages by means of characters or the like.

2. Prior Art

Recently, this kind of individual selective call receiving apparatus increases functions for satisfying demands of users. Characters displayable in the individual selective call receiving apparatus are not limited to the numerals and the Roman alphabets only; namely, many other languages, for example, Japanese kana characters and Chinese letters can be also usable.

In accordance with such trends for multiple functions and multiple languages, there have been already proposed the idea for selectively switching many functions by manipulating mechanical switches as few times as possible, so as to start up various functions with smallest switching operations (as disclosed, for example, in Japanese patent No. SHO 59-53736/1984), and the idea for requesting a user's confirmation before the user starts the operation by displaying a message that the designated operation is going to be performed soon (as disclosed, for example, in Japanese patent No. HEI 3-25059/1991).

However, according to the above-described conventional individual selective call receiving apparatus, the reduction of the number of switching operations may not show a good match with such a message indication on the display unit, although the display unit enables the user to confirm the next-performed operation through the indication thereon. For example, it is not rare for users to mistakenly manipulate between determination and cancellation. If the user wants to confirm whether or not he/she correctly performs the operation, it will possibly take a long time to identify the error since the input was entered by the fewest switch manipulations. Furthermore, there is the possibility that such a confirmation by user's manipulation may induce another errors.

SUMMARY OF THE INVENTION

Accordingly, in view of above-described problems encountered in the prior art, a principal object of the present invention is to provide an excellent individual selective call receiving apparatus enabling users to accurately and quickly accomplish every manipulation.

In order to accomplish this and other related objects, a first aspect of the present invention provides an individual selective call receiving apparatus comprising: a receiving section for receiving a signal transmitted from a base station through an antenna and demodulating the received signal; a signal processing section for processing the signal received through the receiving section; an operating section for allowing a user to instruct a desired processing to the signal processing section; and a display section for displaying a message involved in the received signal processed in the signal processing section, and displaying a confirmation to the instruction entered through the operating section and the content of the processing performed in the signal processing section.

It is preferable that consecutive two or more screens are used for confirming the instruction entered and notifying the content of the processing performed.

Furthermore, a second embodiment of the present invention provides an individual selective call receiving apparatus comprising: receiving means for receiving signals transmitted from a base station through an antenna and demodulating the received signals; message storing means for storing messages involved in the signals received through the receiving means; guide screen storing means for storing guide screens; display means for displaying the messages stored in the message storing means and the guide screens stored in the guide screen storing means; display control means for controlling the display means to display the messages and guide screens; operating means for allowing a user to instruct a desired processing; and control means for responding to an instruction entered from the operating means, reading out a guide screen from the guide screen storing means, controlling the display control means to display the guide screen for requesting a confirmation to the instruction entered through the operating means before executing the instruction, and displaying the content of the processing performed in accordance with the instruction after completing the processing.

Moreover, a third aspect of the present invention provides a display method for an individual selective call receiving apparatus which receives a signal transmitted from a base station through an antenna and demodulates the received signal, stores a message involved in the received signal, and displays the message on a display means, the method comprising steps of: displaying a confirmation guide screen on the display means in response to an instruction entered by a user through an operating means, the confirmation guide screen being a screen requesting the user to confirm the instruction entered through the operating means; executing designated processing in accordance with the instruction when the user authorizes execution of the instruction, and canceling the processing when the user disagrees with execution of the instruction; and displaying a processing result guide screen on the display means upon completion of the designated processing, the processing result guide screen being a screen notifying the user of the content actually executed in accordance with the instruction.

In the above-described individual selective call receiving apparatus or display method thereof, it is desirable that the processing performed in accordance with the instruction is the full deletion of the message stored in the message storing means wherein the message is fully deleted at a time, or the individual deletion of the message wherein letters in the message are successively deleted one by one.

In the individual-deleting mode, the operations of requesting a confirmation to the instruction and displaying the content of the processing executed in accordance with the instruction are repeated, for deleting each of the letters in the message. The letter to be deleted is replaced by a mark on the guide screen for confirming the instruction, and then the mark is replaced by another mark upon completion of the designated processing.

Still further, the processing performed in accordance with the instruction may be protection of the message which uses a confirmation guide screen indicating a combination of an opened lock and a disengaged key, or release of the protection of the message which uses another confirmation guide screen indicating a combination of a closed lock and an engaged.

In accordance with the present invention, the display unit displays the confirmation to the instruction entered through the operating unit and the content of the processing performed in the signal processing unit, as well as ordinary display of messages. Hence, every user can confirm that his/her operation was correctly performed by looking at the display unit. Consequently, users' manipulations can be accomplished accurately and quickly.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
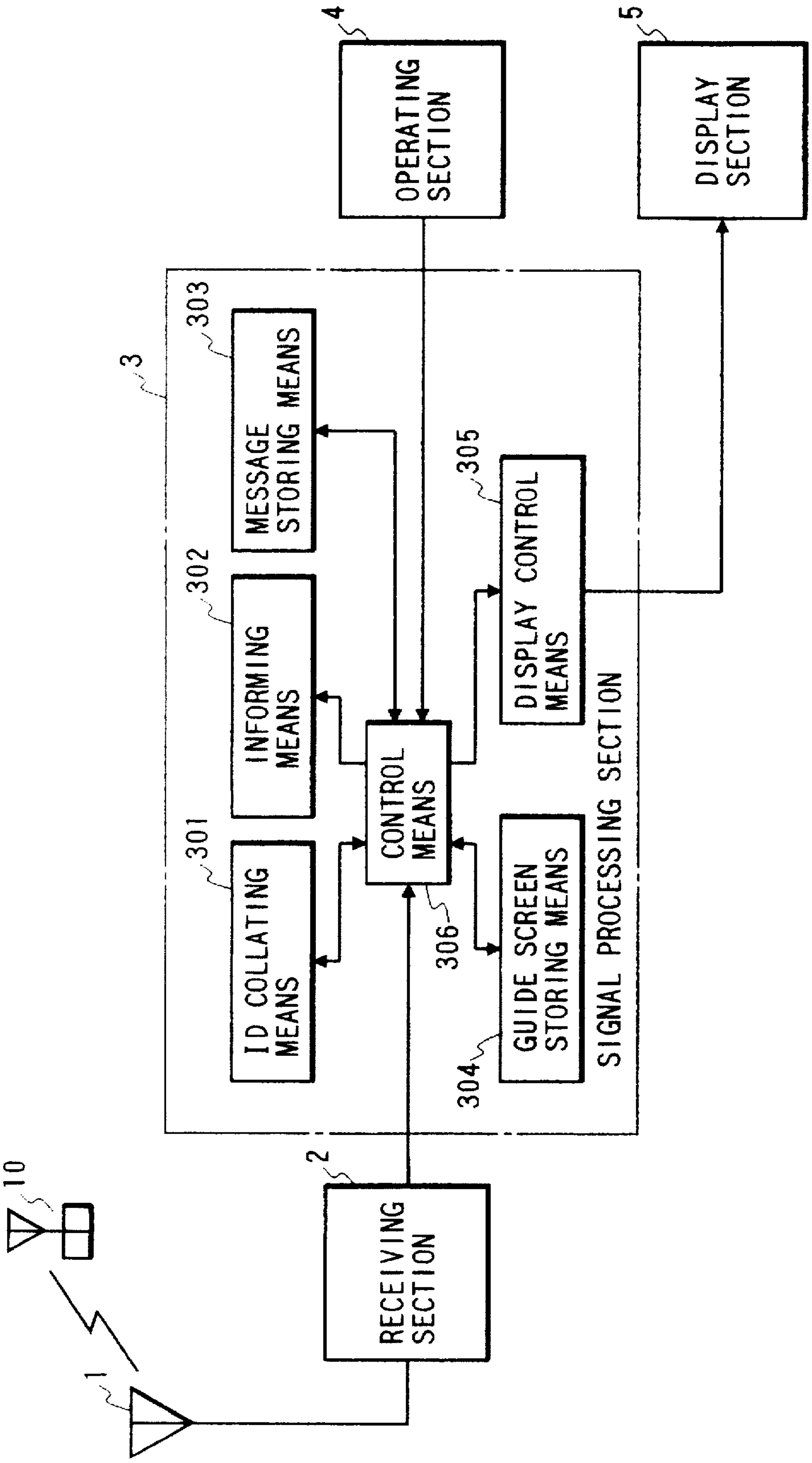
FIG. 1 is a block diagram showing a schematic arrangement of an individual selective call receiving apparatus in accordance with a preferred embodiment of the present invention.

A preferred embodiment of the present invention will be explained in greater detail hereinafter, with reference to the accompanying drawings. Identical parts are denoted by identical reference numeral throughout the views.

Hereinafter, a preferred embodiment of the present invention will be explained with reference to the accompanied drawings. In FIG. 1, reference numeral 1 represents an antenna receiving signals transmitted from a base station 10. Reference numeral 2 represents a receiving section connected to the antenna 1 to demodulate signals received by the antenna 1. Reference numeral 3 represents a signal processing section performing various processings for the demodulated signals. Reference numeral 4 represents an operating section allowing users to input instructions through its keyboard or button switches, or the like. And, reference numeral 5 represents a display section which not only displays messages carried on the receiving signal processed in the signal processing section 3 but displays a confirmation to the instruction entered through the operating section 4 and the content of the processing performed in the signal processing section 3.

The signal processing section 3 further comprises an ID collating means 301 which makes a judgement as to whether or not the received signal involves a message directed to the user, an informing means 302 which notifies the user of the presence of an incoming message, a message storing means 303 for storing messages, a guide screen storing means 304 which stores guide screens used for displaying the confirmation to the instruction entered and the content of the processing performed, a display control means 305 which causes the display section 5 to display the message and guide screens, and a control means 306 for controlling these means 301 though 305 and others.

The operating means 4, in cooperation with the control means 306, has a function of controlling the signal processing section 3 as well as generation of instructions to the display section 5. More specifically, it is possible for users to send the message from the message storing means 303 in the signal processing section 3 to the display means 5 by manipulating the operating means 4. Furthermore, by manipulating the operating means 4, the message stored in the message storing means 303 can be deleted or protected. Moreover, the operating means 4 can change the informing means 302, as well as selection, change, start-up and stop of each function.

Figure 2A:
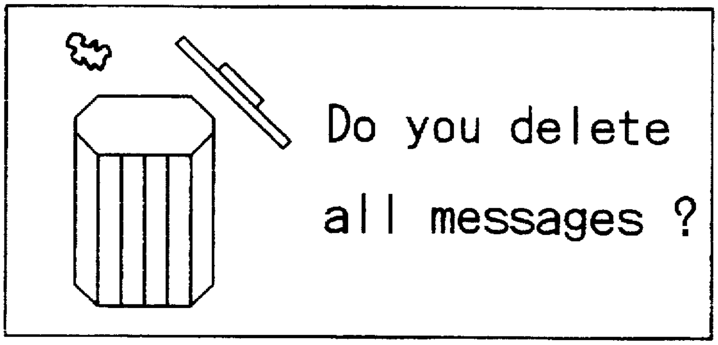
FIGS. 2A and 2B are views showing an example of screens used when the message is deleted in accordance with the embodiment of the present invention.
Figure 2B:
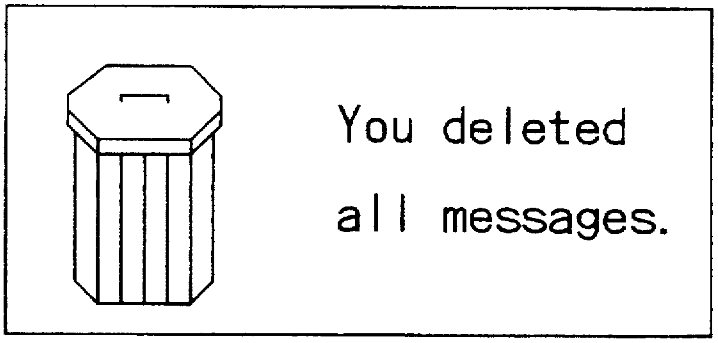

FIGS. 2A and 2B are views showing the example of screens displayed on the display section 5 when the control means 306 deletes the message stored in the message storing means 303 in the signal processing section 3. First, the user operates the operating section 4 to start up the full-deletion mode for deleting the whole content of the message stored in the message storing means 303. In response to this user's manipulation, the display section 5 displays a guide screen shown in FIG. 2A which asks the user "Is it alright to delete the message completely ?", thereby requesting the user to provide a confirmation to the processing to be executed soon by the signal processing section 3.

The user looks up this screen, and manipulates the operating section 4 to authorize the execution of the questioned full-deletion processing when the user can accept it. The signal processing section 3, then, performs the full-deletion processing. After the processing is finished, the display section 5 displays another guide screen shown in FIG. 2B which informs the user "The message has been completely deleted", thereby indicating that the full-deletion processing is correctly executed.

If the user does not want to execute the full-deletion processing, the user will manipulate the operating section 4 to undo that processing. In this case, the display section 5 displays the screen used before starting up the full-deletion mode or a predesignated screen. Thus, it becomes possible for the user to confirm that the full-deletion processing is actually canceled.

On the contrary, the prior art displays the screen like FIG. 2A, and thereafter performs the full-deletion processing through an operating section if the user wants to delete the message or cancel the deleting processing if the user does not want to delete it. In any event, after completing the processing, the screen of the display section returns to the screen displayed before starting up the full-deletion mode or proceeds to a predesignated screen. Hence, the user cannot acknowledge or confirm the operation having been actually done.

Figure 3A:
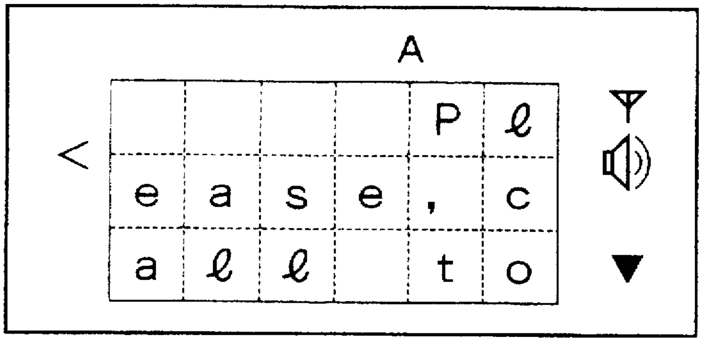
FIGS. 3A through 3D are views showing another example of screens used when the message is deleted in accordance with the embodiment of the present invention.

FIGS. 3A through 3D show another screens of the display section 5 to be used when the message stored is deleted by the units of letter from the message storing means 303 in the signal processing section 3. When the user manipulates the operating section 4 to start up the individual-deletion mode, the display section 5 displays a message designated by the user as an object to be deleted. FIG. 3A shows a part of the message to be deleted.

Figure 3B:
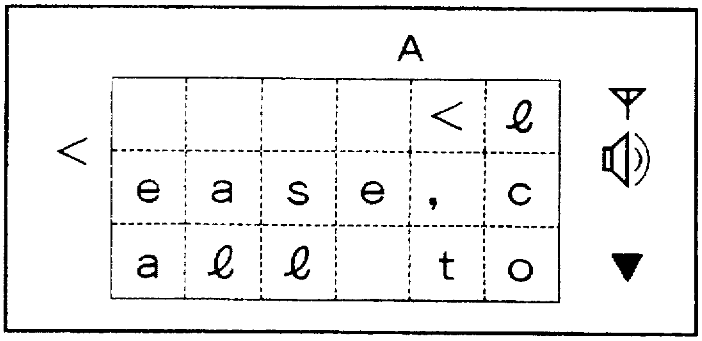

FIG. 3B is a succeeding screen to FIG. 3A wherein the first Chinese character in the message is replaced by a mark "<". This screen is used to request a confirmation of the user; namely, this screen is equivalent to a question "Do you want to delete the first Chinese character ?".

Figure 3C:
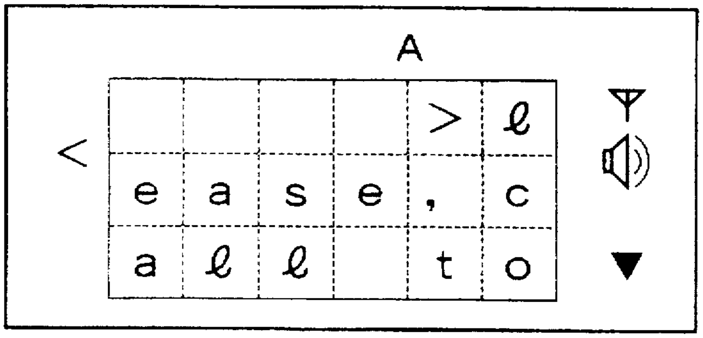
Figure 3D:
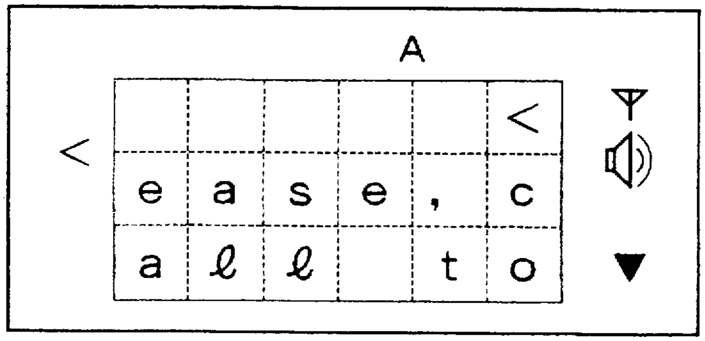

Furthermore, FIG. 3C is a succeeding screen to FIG. 3B wherein the mark "<" is replaced by another mark ">", indicting that the deletion of the first Chinese character is accomplished. FIG. 3D is a succeeding screen to FIG. 3C wherein the mark ">" is deleted and the next Chinese character is replaced by the mark "<", asking a confirmation of deletion of the second Chinese character.

The above-described sequential screen display like FIG. 3A through FIG. 3D will be repeated until the processing of the last Chinese character is accomplished. Namely, when the last Chinese character is replaced by a blank, the screen display for displaying a momentary condition (i.e. interim progress) of the individual-deletion processing is terminated. In this manner, the successive display of the momentary condition, i.e. interim progress, of the individual-deletion processing allows the user to cancel the deleting processing at any intermediate letter in the message.

Figure 4A:
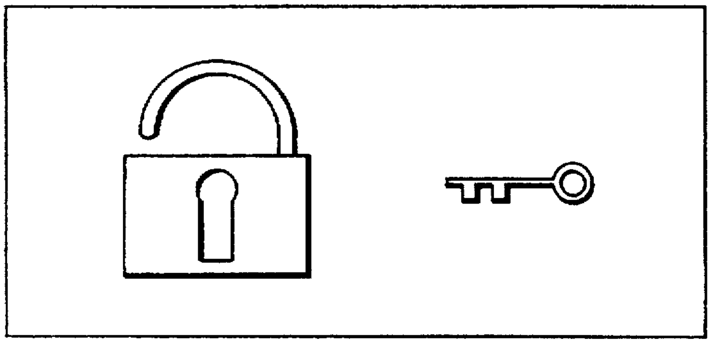
FIGS. 4A and 4B are views showing an example of screens used when the message is protected in accordance with the embodiment of the present invention.
Figure 4B:
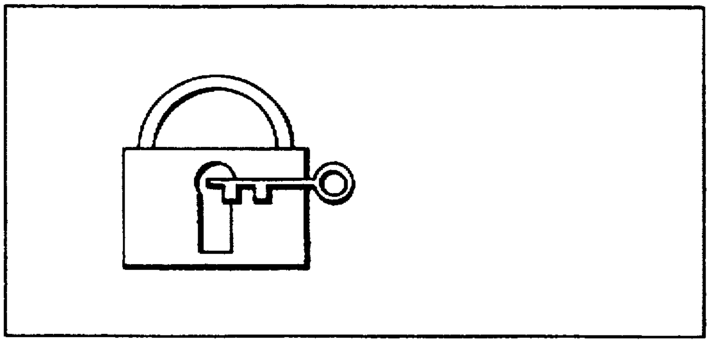

FIGS. 4A and 4B are views showing one example of screens used in the display section 5 for protecting the message stored in the message storing means 303 in the signal processing section 3 and for releasing the protection. The user manipulates the operating section 4 to start up the message protecting mode, the display section 5 displays a guide screen expressing a combination of an opened lock and a disengaged key as shown in FIG. 4A, thereby requesting the user to confirm the protective processing to be next executed. In response to this display, the user instructs the execution of the protective processing through manipulation of the operating section 4.

Upon entry of the authorization by the user, the display section 5 changes the screen to another screen shown in FIG. 4B wherein the key is engaged with the lock and the lock is closed. On the contrary, if the user wants to release the protection of message, the display section 5 displays the screen of FIG. 4B first, and then the screen is replaced by the other screen of FIG. 4A upon suggestion of the execution by the user.

Figure 5:
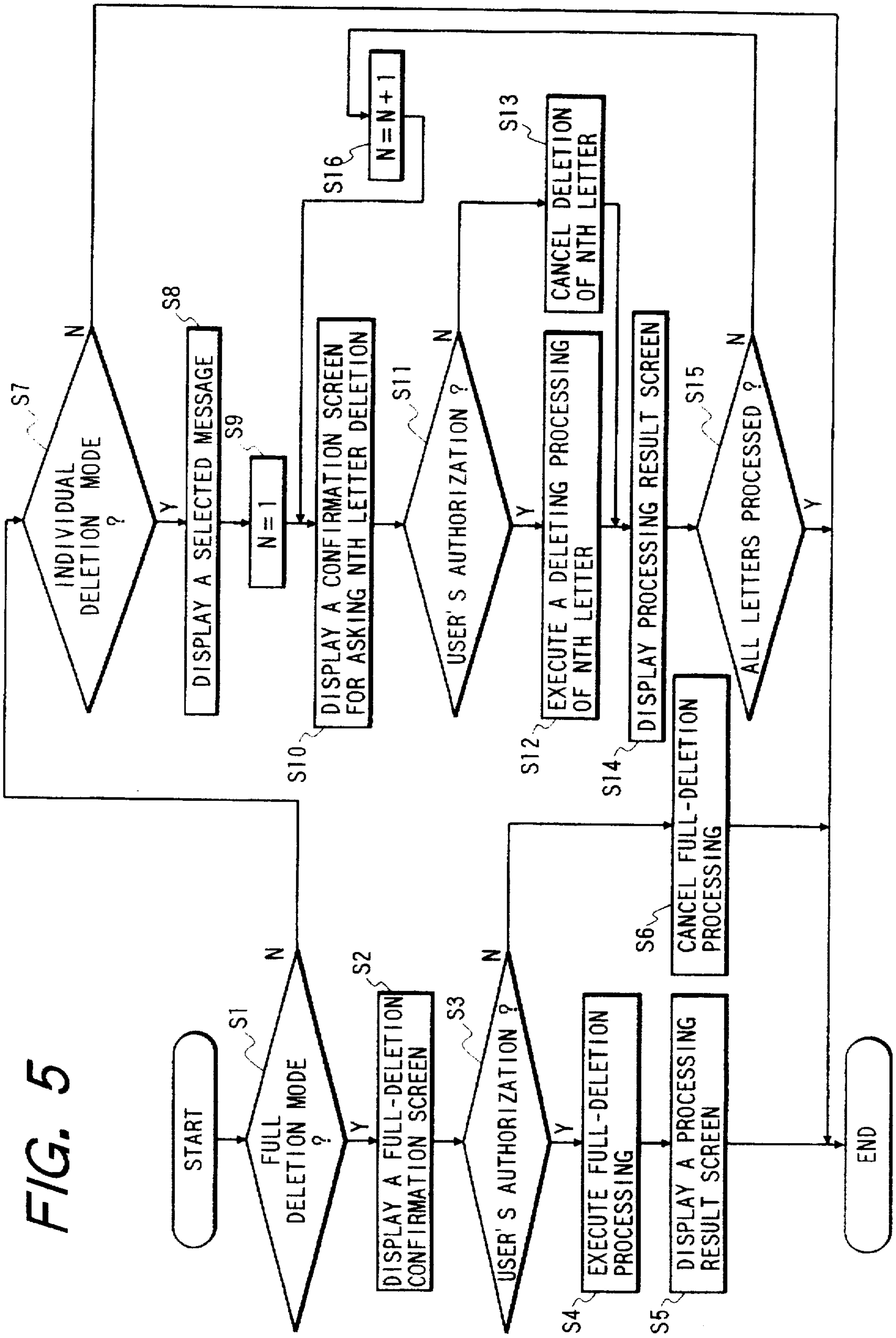
FIG. 5 is a flow chart showing a deleting operation in accordance with the embodiment of the present invention.
Figure 6:
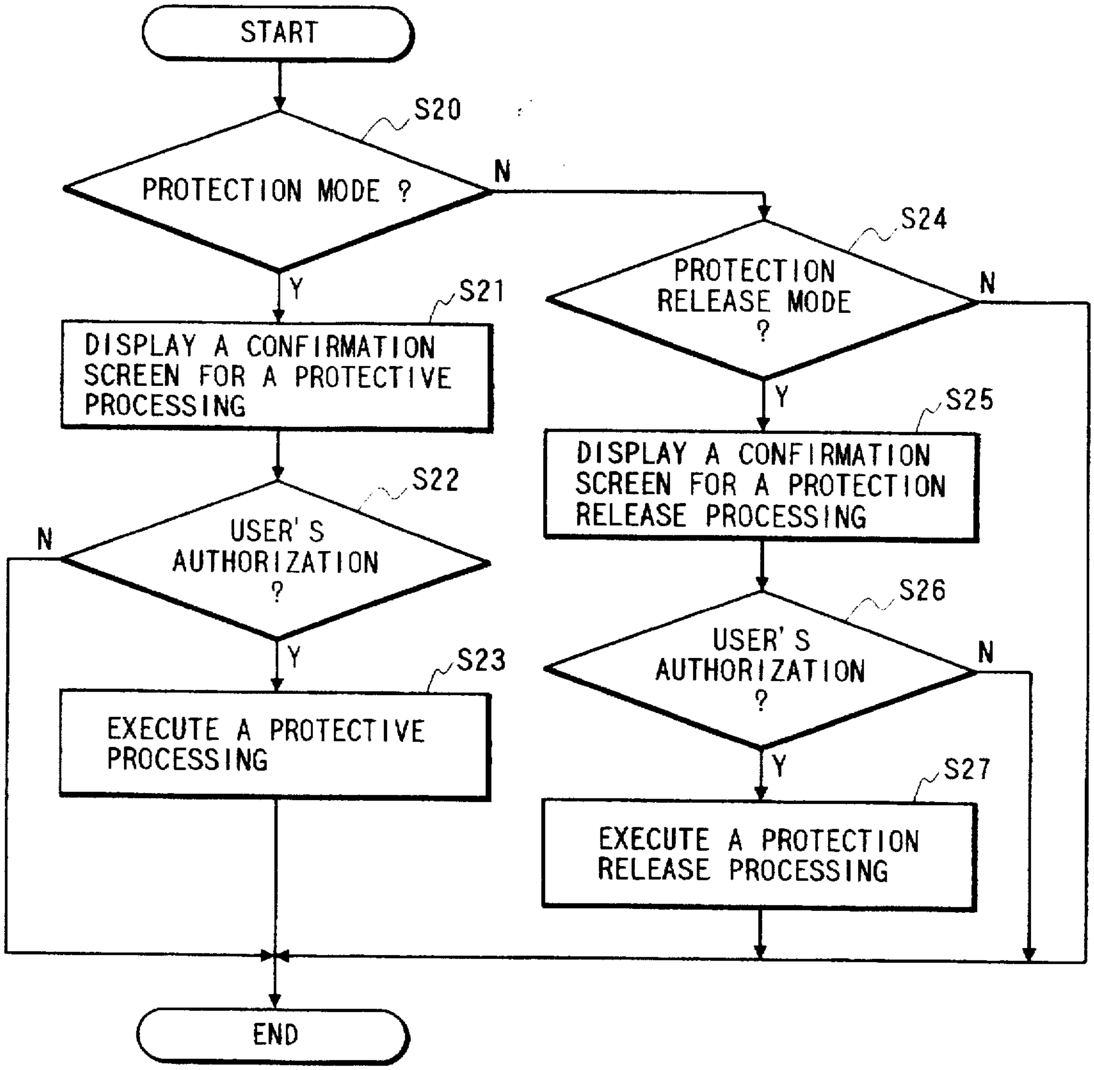
FIG. 6 is a flow chart showing a protecting operation in accordance with the embodiment of the present invention.

FIGS. 5 and 6 are flow charts showing the above-described operations of the individual selective call receiving apparatus.

First, the deletion processing will be explained with reference to FIG. 5. In step S1, the control means 306 makes a judgement as to whether or not the user selected the full-deletion mode by the manipulation through the operating section 4. If the answer is "YES" in the step S1, the control means 306 proceeds to step S2 wherein the control means 306 reads out a full-deletion confirmation screen shown in FIG. 2A from the guide screen storing means 304 and causes the display control means 305 to display the full-deletion confirmation screen on the display section 5. Then, in step S3, the control means 306 checks as to whether or not the user authorizes the full-deletion processing. If the answer is "YES" in the step S3 (namely, if the user agrees with the full-deletion processing by manipulating the operating section 4), the control means 306 proceeds to step S4 to actually execute the full-deletion processing.

More specifically, the control means 306 reads out the message from the message storing means 303 and deletes the same. After completing the full-deletion processing, the control means 306 proceeds to step S5 wherein the control means 306 reads out a processing result screen shown in FIG. 2B from the guide screen storing means 304 and causes the display control means 305 to display this processing result screen on the display section 5, thereby allowing the user to monitor the display screen and confirm that the full-deletion processing has been surely executed.

If the answer is "NO" in the step S3 (namely, if the user disagrees with the full-deletion processing by manipulating the operating section 4), the control means 306 proceeds to step S6 to cancel the full-deletion processing. That is, the user can confirm the instruction entered through the operating section and also check the content of the processing actually performed in the signal processing section 3.

Meanwhile, if the answer is "NO" in the step S1, the control means 306 proceeds to step S7 to check whether or not the user selected the individual deletion mode by the manipulation through the operating section 4. If the answer is "YES" in the step S7, the control means 306 proceeds to step S8 wherein the control means 306 reads out a selected message from the message storing means 303 and causes the display control means 305 to display it on the display section 5 as shown in FIG. 3A. Then, the control means 306 proceeds to step S9 to initialize a value of "N", i.e. N=1.

Subsequently, the control means 306 proceeds to step S10 wherein the control means 306 reads out the confirmation screen shown in FIG. 3B in order to ask the user whether he/she agrees with the deletion of the Nth letter (i.e. the first Chinese character in this cycle of the control procedure) in the selected message.

Next, in step S11, the control means 306 checks as to whether or not the user authorizes the Nth (i.e. 1st) letter deleting processing. If the answer is "YES" in the step S11 (namely, if the user agrees with the Nth letter deleting processing by manipulating the operating section 4), the control means 306 proceeds to step S12 to actually execute the Nth (i.e. 1st) letter deleting processing. More specifically, the control means 306 deletes the Nth letter (i.e. the first Chinese character) from the selected message and displays the result of the deleting processing actually done as shown in FIG. 3C in step S14.

On the other hand, if the answer is "NO" in the step S11, the control means 306 proceeds to step S13 wherein the control means 306 cancels the Nth letter deleting processing. Then, in the step S14, the processing result screen is displayed, thereby notifying the user of the actually executed processing. Hence, the user monitors the display screen and confirms that the individual-deletion processing has been surely executed. In other words, the user can confirm the next-performed processing and check the result of processing by monitoring the display screen.

Subsequently, in step S15, the control means 306 judges whether or not all letters are processed. If the answer is "NO" in the step S15, the control means proceeds to step S16 to increment the value of "N" by adding "1" (i.e. N=N+1), and then returns to the step S10 wherein the control means 306 reads out the confirmation screen shown in FIG. 3D in order to ask the user whether he/she agrees with the deletion of the second Chinese character in the selected message, then executes the steps of S11 through S15. In this manner, the procedure of steps S10 through S15 is continuously repeated until all the letters in the selected message are completely processed.

Accordingly, when the user selected the individual-deletion mode, the display section 5 displays a momentary condition (i.e. interim progress) of the individual-deletion processing. In other words, the successive display of the momentary condition, i.e. interim progress, of the individual-deletion processing allows the user to cancel the deleting processing at any intermediate letter in the message.

Next, the protective processing will be explained with reference to FIG. 6. In step S20, the control means 306 makes a judgement as to whether or not the user selected the protection mode by the manipulation through the operating section 4. If the answer is "YES" in the step S20, the control means 306 proceeds to step S21 wherein the control means 306 reads out the protection confirmation screen shown in FIG. 4A from the guide screen storing means 304 and causes the display control means 305 to display the protection confirmation screen on the display section 5. Then, in step S22, the control means 306 checks as to whether or not the user authorizes the protective processing.

If the answer is "YES" in the step S22 (namely, if the user agrees with the protective processing by manipulating the operating section 4), the control means 306 proceeds to step S23 to actually execute the protective processing. More specifically, the control means 306 reads out the message from the message storing means 303 and applies a predetermined protective processing to that message. After completing the protective processing, or when the answer is "NO" in the step S22, the control means 306 ends the processing of the present cycle.

Meanwhile, if the answer is "NO" in the step S20, the control means 306 proceeds to step S24 wherein the control means 306 checks whether or not the user selected the protection release mode by the manipulation through the operating section 4. If the answer is "YES" in the step S24, the control means 306 proceeds to step S25 wherein the control means 306 reads out the protection release confirmation screen shown in FIG. 4B from the guide screen storing means 304 and causes the display control means 305 to display the protection release confirmation screen on the display section 5. Then, in step S26, the control means 306 judges as to whether or not the user authorizes the protection release processing.

If the answer is "YES" in the step S26 (namely, if the user agrees with the protection release processing by manipulating the operating section 4), the control means 306 proceeds to step S27 to actually execute the protection release processing. More specifically, the control means 306 reads out the message from the message storing means 303 and applies a predetermined protection release processing to that message. After completing the protection release processing, or when the answer is "NO" in the step S24 or S26, the control means 306 ends the processing of the present cycle.

That is, the embodiment of the present invention allows the user to confirm the protective processing to be next executed. Monitoring the display screen, the user instructs the execution of the protective processing through manipulation of the operating section 4.

As apparent from the foregoing description, the present invention provides an individual selective call receiving apparatus having the display section which is capable of displaying the confirmation to the instruction entered through the operating section and the content of the processing performed in the signal processing section.

Hence, users can check the interim progress of the processing through the display screen; therefore, the users can confirm whether or not the processing has been accurately performed. Thus, the operation can be completed accurately and quickly.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An individual selective call receiving apparatus comprising:

a receiving section for receiving a signal transmitted from a base station through an antenna and demodulating the received signal;

a signal processing section for processing the signal received through said receiving section;

an operating section for allowing a user to instruct desired processing to said signal processing section; and a display section for displaying a message involved in the received signal processed in said signal processing section, said display section further displaying a specific image for requesting the user's confirmation to said instruction entered through said operating section before executing said instruction and displaying content of the processing performed in said signal processing section including interim progress thereof after finishing part of said processing.

2. An individual selective call receiving apparatus comprising:

a receiving section for receiving a signal transmitted from a base station through an antenna and demodulating the received signal;

a signal processing section for processing the signal received through said receiving section;

an operating section for allowing an user to instruct a desired processing to said signal processing section; and a display section for displaying a message involved in the received signal processed in said signal processing section, and displaying a confirmation to the instruction entered through said operating section and the content of the processing performed in said signal processing section, wherein said display section displays the confirmation to the instruction entered through said operating section and the content of the processing performed in said signal processing section, including interim progress thereof, using consecutive two or more screens.

3. An individual selective call receiving apparatus comprising:

receiving means for receiving signals transmitted from a base station through an antenna and demodulating the received signals;

message storing means for storing messages involved in said signals received through the receiving means;

guide screen storing means for storing guide screens;

display means for displaying said messages stored in said message storing means and said guide screens stored in said guide screen storing means;

display control means for controlling said display means to display said messages and guide screens;

operating means for allowing a user to instruct desired processing; and control means for responding to an instruction entered from said operating means, reading out a guide screen from said guide screen storing means, controlling said display control means to display said guide screen for requesting confirmation of the instruction entered through said operating means before executing the instruction, and displaying the content of the processing performed in accordance with said instruction after completing the processing including displaying interim progress of the processing after finishing part of said processing.

4. The individual selective call receiving apparatus defined by claim 3, wherein said processing performed in accordance with said instruction is deletion of the message stored in said message storing means.

5. The individual selective call receiving apparatus defined by claim 4, wherein said message is fully deleted at a time.

6. The individual selective call receiving apparatus defined by claim 4, wherein letters in said message are successively deleted one by one.

7. The individual selective call receiving apparatus defined by claim 6, wherein said control means repeats said operations of requesting a confirmation to the instruction entered through said operating means before executing the instruction and displaying the content of the processing performed in accordance with said instruction after completing the processing, for deleting each of the letters in said message.

8. The individual selective call receiving apparatus defined by claim 7, wherein a letter to be deleted is replaced by a mark on the guide screen for confirming the instruction.

9. The individual selective call receiving apparatus defined by claim 8, wherein said mark is replaced by another mark on the guide screen upon completion of said processing.

10. The individual selective call receiving apparatus defined by claim 3, wherein said processing performed in accordance with said instruction is protection of the message.

11. The individual selective call receiving apparatus defined by claim 10, wherein said display means displays a guide screen indicating a combination of an opened lock and a disengaged key when the instruction is protection of the message.

12. The individual selective call receiving apparatus defined by claim 3, wherein said processing performed in accordance with said instruction is release of protection of the message.

13. The individual selective call receiving apparatus defined by claim 12, wherein said display means displays a guide screen indicating a combination of a closed lock and an engaged key when the instruction is release of protection of the message.

14. A display method for an individual selective call receiving apparatus which receives a signal transmitted from a base station through an antenna and demodulates the received signal, stores a message involved in said received signal, and displays said message on a display means, said method comprising the steps of:

displaying a confirmation guide screen on said display means in response to an instruction entered by a user through an operating means, said confirmation guide screen being a screen requesting the user to confirm said instruction entered through said operating means before executing said instruction;

executing designated processing in accordance with said instruction when the user authorizes execution of said instruction, and canceling said processing when the user disagrees with execution of said instruction; and displaying a processing result guide screen on said display means upon completion of said designated processing, said processing result guide screen being a screen notifying the user of the content actually executed in accordance with the instruction including interim progress thereof after finishing part of said processing.

15. The display method defined by claim 14, wherein said processing executed in accordance with said instruction is deletion of the message.

16. The display method defined by claim 15, wherein said message is fully deleted at a time.

17. The display method defined by claim 15, wherein letters in said message are successively deleted one by one.

18. The display method defined by claim 17, wherein said steps of requesting a confirmation to the instruction and displaying the content of the processing executed in accordance with said instruction are repeated, for deleting each of the letters in said message.

19. The display method defined by claim 18, wherein a letter to be deleted is replaced by a mark on the guide screen for confirming the instruction.

20. The display method defined by claim 19, wherein said mark is replaced by another mark on the guide screen upon completion of said designated processing.

21. The display method defined by claim 14, wherein said processing executed in accordance with said instruction is protection of the message.

22. The display method defined by claim 21, wherein said confirmation guide screen is a combination of an opened lock and a disengaged key when the instruction is protection of the message.

23. The display method defined by claim 14, wherein said processing executed in accordance with said instruction is release of protection of the message.

24. The display method defined by claim 23, wherein said confirmation guide screen is replaced by another guide screen indicating a combination of a closed lock and an engaged key when the instruction is release of protection of the message.

* * * * *